(12) United States Patent
Ozias et al.

(10) Patent No.: US 9,122,356 B2
(45) Date of Patent: Sep. 1, 2015

(54) VIRTUAL PERIPHERY DISPLAY BUTTONS

(75) Inventors: Orin Michael Ozias, Austin, TX (US); Kevin Warren Mundt, Austin, TX (US); Juan Rafael Vega, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 987 days.

(21) Appl. No.: 12/261,637

(22) Filed: Oct. 30, 2008

(65) Prior Publication Data

US 2010/0110019 A1    May 6, 2010

(51) Int. Cl.
*G06F 3/041* (2006.01)
*G06F 3/044* (2006.01)
*G06F 3/0354* (2013.01)
*G06F 3/0488* (2013.01)

(52) U.S. Cl.
CPC ............ *G06F 3/044* (2013.01); *G06F 3/03547* (2013.01); *G06F 3/04886* (2013.01); *G06F 2203/0339* (2013.01)

(58) Field of Classification Search
CPC .................... G06F 3/03547; G06F 2203/0339; G06F 3/04886; G06F 3/044
USPC .......................................................... 345/173
See application file for complete search history.

(56) References Cited

U.S. PATENT DOCUMENTS

| | | | |
|---|---|---|---|
| 2005/0088417 A1* | 4/2005 | Mulligan | 345/173 |
| 2006/0238517 A1* | 10/2006 | King et al. | 345/173 |
| 2008/0284752 A1* | 11/2008 | Hsu et al. | 345/173 |
| 2010/0251115 A1 | 9/2010 | Vega et al. | 715/702 |

* cited by examiner

*Primary Examiner* — Charles V Hicks
(74) *Attorney, Agent, or Firm* — Baker Botts L.L.P.

(57) ABSTRACT

An input device for use with an information handling system is disclosed. The input device may include a display device having a viewing area defined by a perimeter, a graphic user interface configured to display a virtual button within the viewing area adjacent the perimeter, a frame adjacent the perimeter of the viewing area, and a proximity sensing element associated with the frame and located outside the viewing area of the display device. The proximity sensing element may be configured to sense a user selecting the virtual button displayed by the graphic user interface.

20 Claims, 4 Drawing Sheets

VIRTUAL PERIPHERY DISPLAY BUTTONS

TECHNICAL FIELD

The present disclosure relates in general to information handling systems, and more particularly to virtual periphery display buttons for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

FIG. 1 depicts selected elements of an example prior art information handling system 1. Information handling system 1 includes a host 10, which may include processing resources (e.g., one or more central processing units (CPUs) and storage resources that are accessible to the processing resources) in a case 12.

Case 12 may include any chassis, cabinet, tower, box, and/or enclosure appropriate for housing information handling system 1. Storage resources may include volatile storage or memory and/or persistent storage, e.g., disk storage, flash memory or other type of erasable read only memory (ROM), and the like.

Information handling system 1 may also include various other peripheral or I/O devices known in the field of data processing system design, such as a display 20, a keyboard 30, and a mouse 32 shown in FIG. 1. Display 20 may include any information display for visual presentation of images, texts, and/or other output from information handling system 1 (e.g., a monitor).

FIG. 2 depicts selected elements of an example prior art information handling system 2. Information handling system 2 may include a mobile information handling device, e.g., laptop 10a shown in FIG. 2 or any other type of mobile computing device (e.g., a tablet computer, a notebook computer, a PDA, a cellphone, etc.). Information handling system 2 may include processing resources (e.g., one or more central processing units (CPUs) and storage resources that are accessible to the processing resources) in a case 12a.

Information handling system 2 may also include various other peripheral or I/O devices known in the field of data processing system design, such as a display 20a, a keyboard 30a, and a touchpad 32a shown in FIG. 2.

Case 12a may include any chassis, cabinet, tower, box, and/or enclosure appropriate for housing information handling system 2. Display 20a may include any information display for visual presentation of images, texts, and/or other output from information handling system 2 (e.g., a monitor). Keyboard 30a may include any arrangement of buttons and/or keys designed for the input of text, characters, and/or operational controls for information handling system 2.

Laptop 10a may also include processing resources, e.g., one or more central processing units (CPUs) and storage resources that are accessible to the processing resources. Storage resources may include volatile storage or memory and/or persistent storage, e.g., disk storage, flash memory or other type of erasable read only memory (ROM), and the like.

SUMMARY

In accordance with one embodiment of the present disclosure, an input device for use with an information handling system is provided. The input device may include a display device having a viewing area defined by a perimeter, a graphic user interface configured to display a virtual button within the viewing area adjacent the perimeter, a frame adjacent the perimeter of the viewing area, and a proximity sensing element associated with the frame and located outside the viewing area of the display device. The proximity sensing element may be configured to sense a user selecting the virtual button displayed by the graphic user interface.

In accordance with another embodiment of the present disclosure, an information handling system is provided. The information handling system may include a processor, a memory communicatively coupled to the processor, and an input device. The input device may include a display device having a viewing area defined by a perimeter, a graphic user interface configured to display a virtual button within the viewing area adjacent the perimeter, a frame adjacent the perimeter of the viewing area, and a proximity sensing element associated with the frame and located outside the viewing area of the display device. The proximity sensing element may be configured to sense a user selecting the virtual button displayed by the graphic user interface. The input device may be configured to communicate the selection of the virtual button to the processor.

In accordance with yet another embodiment of the present disclosure, a computer program product is disclosed. The computer product may comprise computer executable instructions, stored on a tangible computer readable medium, for allowing a user to select a virtual button on a display device. The instructions may comprise instructions for displaying a virtual button within a viewing area of the display device, the virtual button adjacent a perimeter defining the viewing area of the display device, instructions for sensing a user selecting the virtual button, and instructions for communicating the selection of the virtual button to a processor.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 3 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
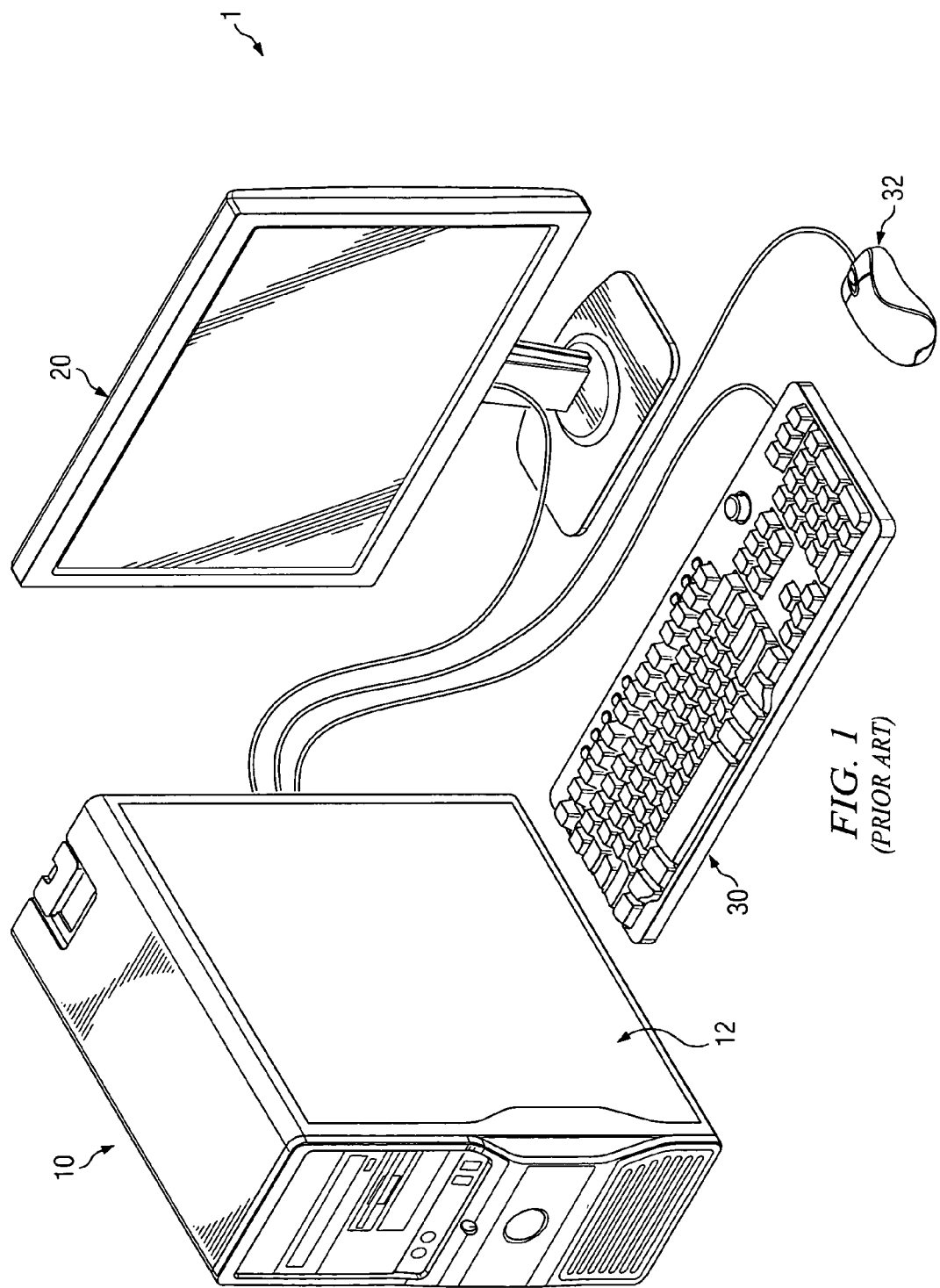
FIG. 1 illustrates a prior art information handling system.
Figure 2:
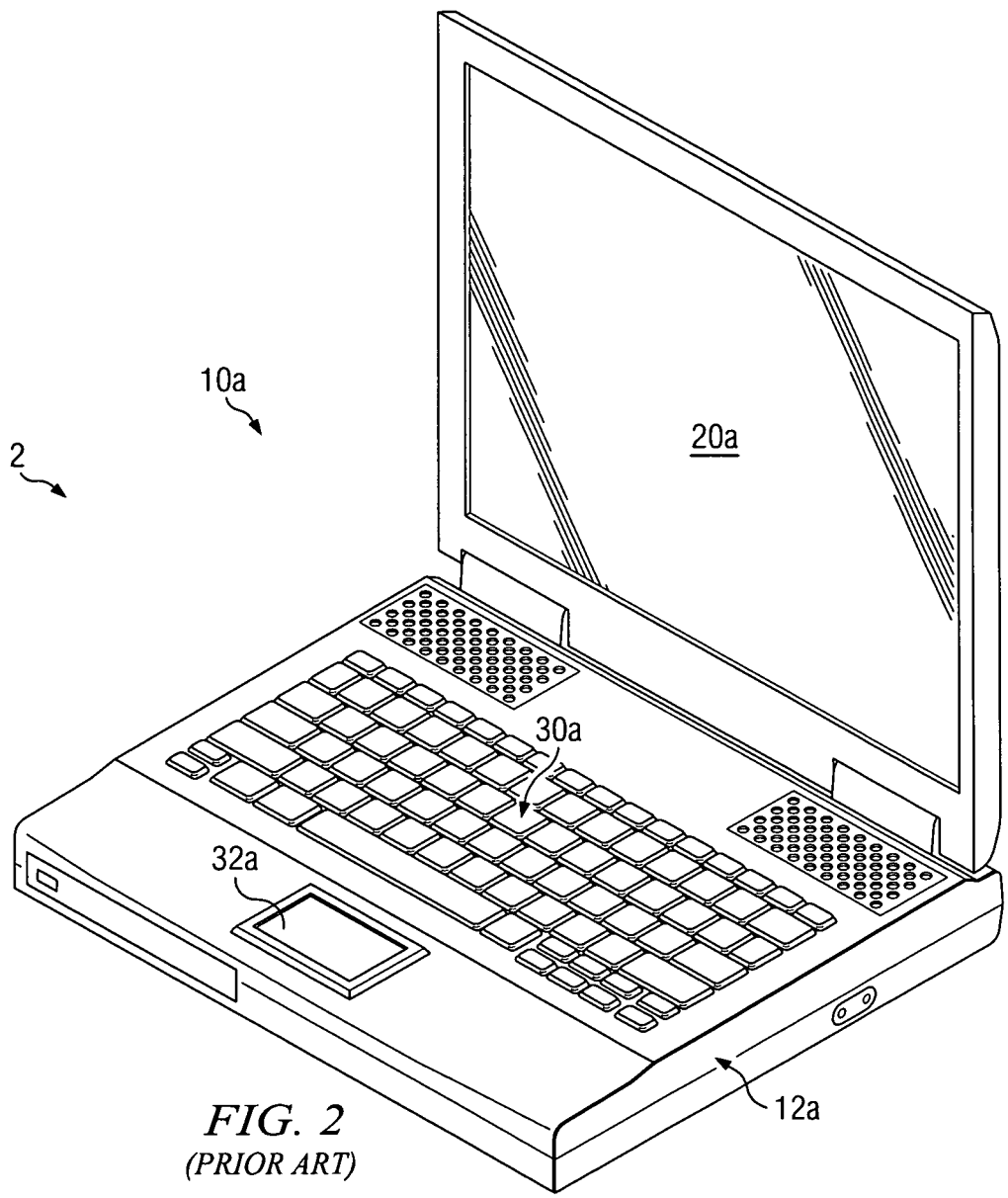
FIG. 2 illustrates a second prior art information handling system.
Figure 3:
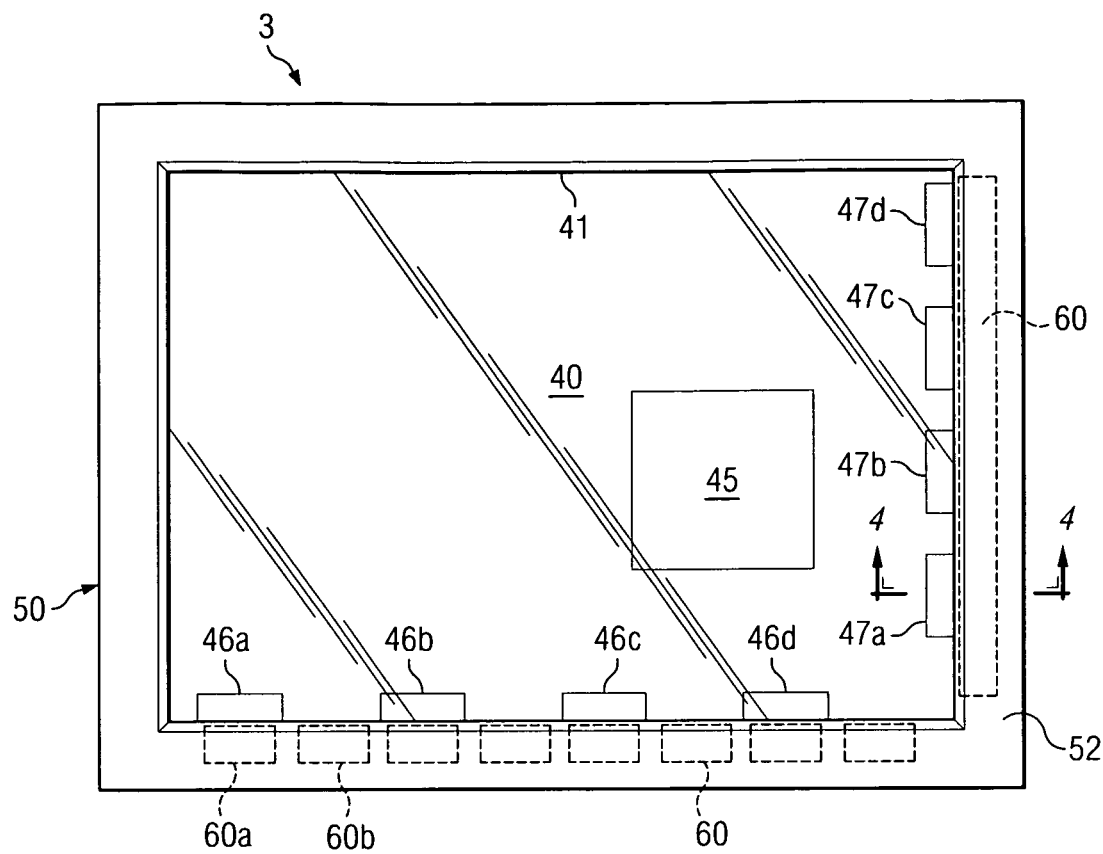
FIG. 3 illustrates an example input device including sensing elements for detecting selections of virtual buttons displayed on a screen, in accordance with teachings of the present disclosure.

FIG. 3 illustrates an example input device 3 for an information handling system in accordance with teachings of the present disclosure. Input device 3 may include a display device 40 with a viewing area defined, at least in part, by perimeter 41, a graphic user interface (GUI) 45, and a frame 50. The display device may comprise a monitor and/or a display for use with an information handling system (e.g., a liquid crystal display (LCD), a cathode ray tube display (CRT), a plasma display, a video projector, a surface-conduction electron-emitter display (SED), and/or an organic light-emitting diode display (OLED)).

Frame 50 may include any device and/or component of input device 3 adjacent perimeter 41 of display device 40. In some embodiments, frame 50 may include a bezel 52. Bezel 52 may comprise a panel configured to cover the front of input device 3. Bezel 52 may be integral to frame 50 or removable.

GUI 45 may include a user interface that allows a user to interact with an information handling system. In some embodiments, GUI 45 may display icons, text, and/or visual indicators related to the operation of an information handling system. For example, GUI 45 may include the display associated with one or more operating systems appropriate to the information handling system associated with input device 3.

As shown in FIG. 3, GUI 45 may display one or more virtual buttons 46a-46d and 47a-47d, taskbars, or other icons useful in the operation of an information handling system. Virtual buttons 46 and 47 may be activated by a finger or other selector (e.g., pen, stylus, etc.) coming into proximity with proximity sensing element(s) 60 adjacent virtual buttons 46 and 47. In some embodiments, proximity sensing element(s) 60 for sensing a finger or other selector may be located below bezel 52 or otherwise associated with frame 50.

Input device 3 may include any suitable number of proximity sensing elements 60. For example, input device 3 may include a single proximity sensing element 60 extending along a side of frame 50 and configured for sensing touches on GUI 45 along that side of GUI 45. For instance, as shown in FIG. 3, a single proximity sensing element 60 extending along the right side of frame 50 and may be configured to sense a user touching any of virtual buttons 47a-47d.

As another example, input device 3 may include multiple proximity sensing elements 60 along a side of frame 50 and configured for sensing touches on GUI 45 along that side of GUI 45. For instance, as shown in FIG. 3, eight proximity sensing elements 60 are positioned along the bottom side of frame 50 and each may be configured to sense a user touching a corresponding virtual button. For example, proximity sensing element 60a may be configured to sense a user touching virtual button 46a, proximity sensing element 60b may be configured to sense a user touching virtual button 46b, and so on.

Virtual buttons 46 and 47 may be "soft buttons" such that multiple different functions may be displayed on each particular virtual button 46, 47, e.g., based on the application currently displayed on GUI 45.

Figure 4:
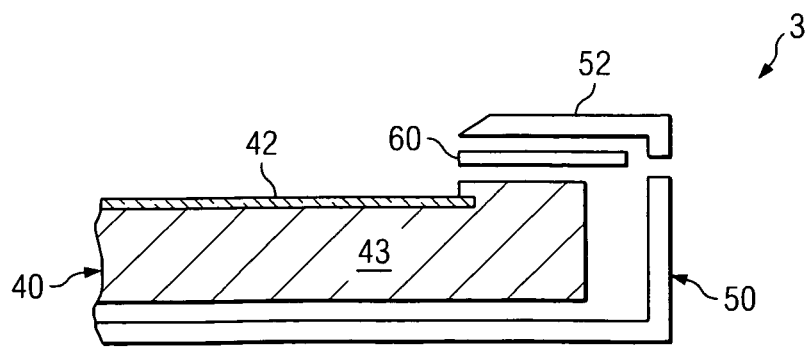
FIG. 4 illustrates a cross-section view of the example input device shown in FIG. 3, taken along line 4-4 shown in FIG. 3.

In some embodiments, one, some, or all of virtual buttons 46 and 47 may also be selected using an virtual pointer displayed on the screen, e.g., using a mouse, trackball, touchpad, etc. FIG. 4 illustrates a cross-section view of example input device 3, taken along line 4-4 shown in FIG. 3. As shown in FIG. 4, the cross-section of input device 3 may include display device 40, frame 50, and a proximity sensing element 60.

Display device 40 may include an LCD panel 42 and a substrate 43. An LCD display is only one of many example display devices that may be used in accordance with the teachings of the present disclosure.

Figure 5:
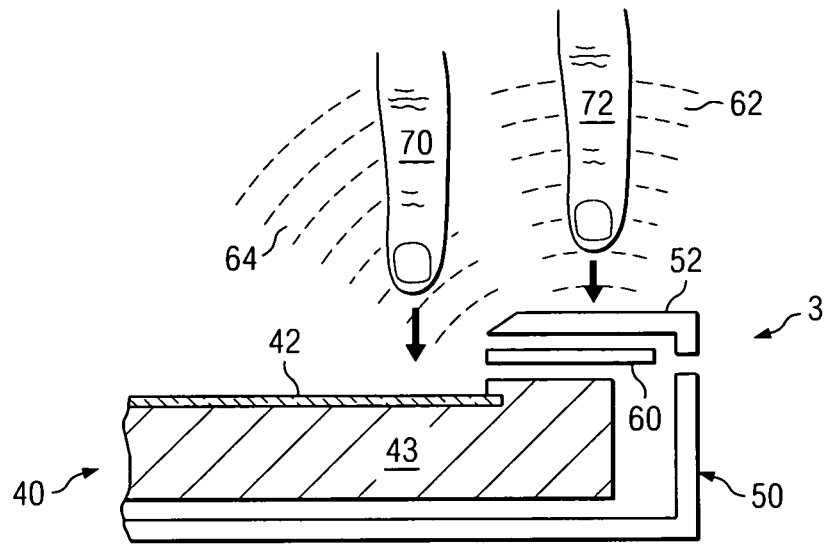
FIG. 5 illustrates a user selection of a virtual button of the example input device of FIG. 3, according to the teachings of the present disclosure.

Proximity sensing element 60 may include any device, component, and/or feature of input device 4 configured to sense contact and/or the approach of a finger or other selector (shown and discussed in more detail with relation to FIG. 5). For example, proximity sensing element 60 may include a capacitive proximity sensing element. As shown in FIG. 4, proximity sensing element 60 may be associated with frame 50 (e.g., located under and/or coupled to bezel 52) and located outside the effective viewing area of display device 40.

As an example, a capacitive proximity sensing element may include a thin coating of an oxide or other conductive material (e.g., indium tin oxide). The coating may be configured to conduct a precise electrical current across the sensor, creating a first capacitive field (e.g., a reference field). A human finger or other selector provides a second capacitive field. When the second field comes into proximity with the first field, each is distorted from its normal state. A capacitive proximity sensing element may include one or more electrical circuits operable to measure the resulting distortion and compare it to the reference field.

FIG. 5 shows input device 3 in use according to the teachings of the present disclosure. Proximity sensing element 60 may be configured to sense a finger or other selector 70 approaching and/or touching a particular virtual button (e.g., virtual button 47a). As the person's finger approaches the particular virtual button, the finger comes within range of proximity sensing element 60, which generates a signal indicating that the particular virtual button has been selected.

In some instances, a proximity sensing element 60 may determine that a virtual button has been "touched" by a selector when the selector approaches or nearly touches the virtual button, before or without actual physical contact between the selector and display device 40. Thus, as used herein, references to "touching" a virtual button may refer to any physical contact or near-contact of a virtual button that is detected by a proximity sensing element 60.

In implementations in which a single proximity sensing element 60 extends along side multiple virtual buttons (e.g., proximity sensing element 60 on the right side of display device 40 shown in FIG. 3), the proximity sensing element 60 may be operable to identify the location of the finger along the length of the proximity sensing element 60, and identify the corresponding virtual button accordingly.

In some examples, proximity sensing element 60 may be configured to differentiate between a selector 70 approaching directly above proximity sensing element 60 and a selector 72 approaching the area of display device 40 adjacent frame 50 and/or bezel 52, which may be useful in certain embodiments, as discussed below regarding FIG. 6.

Some known input devices include a transparent touch screen covering the viewing area of the display device. Such a design may provide variable operation of virtual buttons by changing the output of a GUI displayed on the touch screen. Such touch screens add weight, cost, and thickness to a display device. In other known input devices, physical buttons are located within a frame or bezel and corresponding function names and/or labels are displayed within the viewing area of the display device. Such "soft buttons" often confuse users who try to select or press the displayed labels rather than the physical buttons.

In contrast, an input device incorporating teachings of the present disclosure (e.g., input device 3) may include one or more proximity sensing elements 60 adjacent perimeter 41 of the viewing area of display device 40. Proximity sensing element(s) 60 may be coupled to, covered by, enclosed by, and/or otherwise associated with frame 50 and/or bezel 52. In some embodiments, proximity sensing element(s) 60 may not be visible to a user and, therefore, need not be transparent.

Input devices incorporating teachings of the present disclosure (e.g., input device 3) may display virtual buttons 46 and 47 in GUI 45 adjacent perimeter 41. A user may select virtual buttons 46 and 47 by touching virtual buttons 46 and 47, which touches are detected by adjacent proximity sensing element(s) 60. As an example, virtual buttons 46 and 47 may correspond to toolbars, taskbars, and/or other status indicators and/or selectors used in an operating system (e.g., MICROSOFT WINDOWS®, LINUX-OS®, MAC OS®, and/or SOLARIS®). As another example, virtual buttons 46 and 47 may include icons, widgets, and/or any other function related to an information handling system. Although the figures of the present disclosure may show buttons 46 and 47 adjacent certain sides of perimeter 41, the teachings of the present disclosure may be applied to provide virtual periphery buttons adjacent any portion(s) of perimeter 41.

Figure 6:
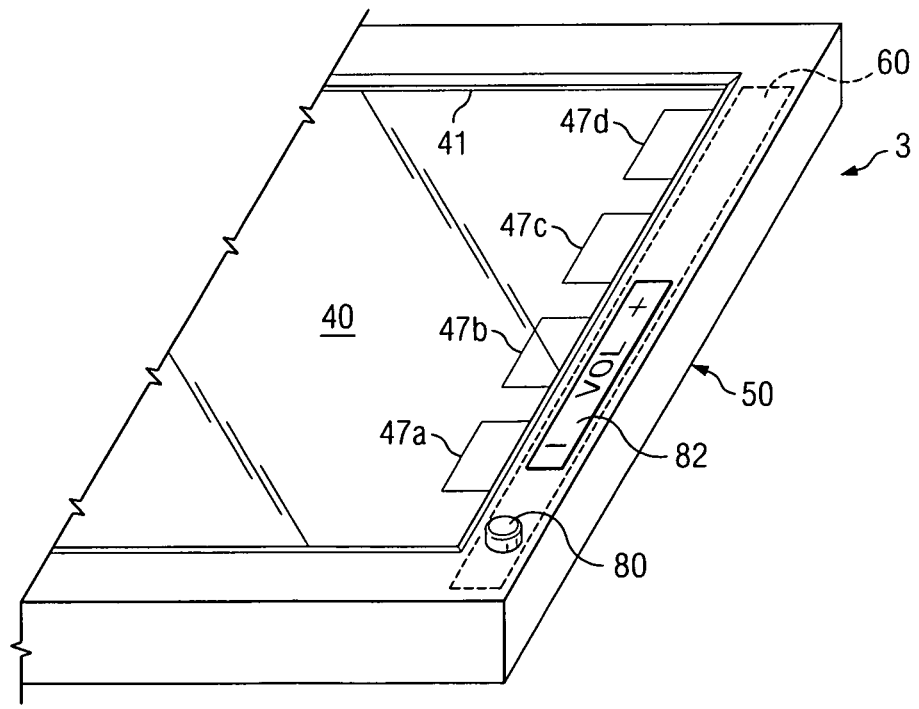
FIG. 6 illustrates an input device including physical and virtual buttons on the frame, in addition to virtual buttons displayed on the screen adjacent the frame, in accordance with teachings of the present disclosure.

FIG. 6 illustrates an input device 3 including buttons on frame 50 in addition to virtual buttons 46, 47 adjacent frame 50, according to certain embodiments. Such buttons on frame 50 may include one or more physical buttons 80 and/or virtual buttons 82 corresponding to any suitable functions. In the illustrated example, input device 3 includes a physical power button 80 and a virtual slider 82 to adjust the volume of an associated information handling system.

Input device 3 may use any of a variety of techniques for distinguishing between a selection of a virtual button displayed on GUI 45 (e.g., virtual buttons 46, 47) and a selection of a virtual button displayed on frame 50 (e.g., virtual button 82). For example, with reference to FIG. 5, in some embodiments, a proximity sensing element 60 may be configured to differentiate between (a) a selector 72 approaching a virtual button displayed adjacent frame 50 or bezel 52 and (b) a selector 70 approaching a virtual button 82 on frame 50 or bezel 52, e.g., by detecting the location and/or angle of the approaching selector, or using any other suitable techniques. As another example, in some embodiments, a proximity sensing element 60 may be configured to differentiate between a single point touch and a sliding and/or scrolling movement by a selector. Thus, proximity sensing element 60 may distinguish between a user attempting to touch virtual button 47b and the user attempting to slide or scroll volume adjuster 82.

Virtual buttons 82 may provide any suitable functions, and may include any type of virtual buttons, e.g., touch-type or scroll/slider-type buttons. Example functions of scroll/slider-type virtual buttons may include scrolling within a window, minimizing and/or maximizing an open window, selecting from a menu, and/or any other function implemented by a user sliding his or her finger along a proximity sensing element 60.

Input devices incorporating teachings of the present disclosure may provide function and experience similar to a touch screen without imposing additional cost and weight inherent to touch screen devices. The exemplary implementations of input devices presented herein may emphasize the context of monitors and/or displays; it should be understood, however, that the input devices described herein may also be appropriate for all types of information handling systems including, as examples, desktop systems, mobile systems including notebook or lap top systems, and hand held systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Although the figures and embodiments disclosed herein have been described with respect to display screens for information handling systems, it should be understood that various changes, substitutions and alternations can be made herein without departing from the spirit and scope of the disclosure as illustrated by the following claims.

What is claimed is:

1. An input device for use with an information handling system, the device comprising:
   a display device having a viewing area defined by a perimeter;
   a graphic user interface configured to display a plurality of virtual buttons within a contiguous region of the viewing area adjacent the perimeter;
   a frame adjacent the perimeter of the viewing area; and
   a proximity sensing element associated with the frame and located outside the viewing area of the display device;
   wherein the proximity sensing element is configured to sense a user selecting one of the virtual buttons displayed by the graphic user interface.

2. An input device according to claim 1, wherein the frame includes a bezel.

3. An input device according to claim 1, wherein a user selecting the virtual button displayed by the graphic user interface includes the user touching the display device in the proximity of the virtual button.

4. An input device according to claim 1, further comprising the graphic user interface configured to denote a second virtual button outside of the viewing area and on the frame.

5. An input device according to claim 1, further comprising:
   a second virtual button on the frame; and
   the proximity sensing element configured to sense a user selecting the second virtual button.

6. An input device according to claim 1, wherein the proximity sensing element includes a capacitive proximity sensing element.

7. An input device according to claim 1, wherein the frame surrounds the entire viewing area of the display device.

8. An input device according to claim 1, wherein the graphic user interface is configured to display a plurality of virtual buttons adjacent the perimeter of the viewing area.

9. An information handling system comprising:
   a processor;
   a memory communicatively coupled to the processor; and
   an input device comprising:
      a display device having a viewing area defined by a perimeter;
      a graphic user interface configured to display a plurality of virtual buttons within a contiguous region of the viewing area adjacent the perimeter;
      a frame adjacent the perimeter of the viewing area; and
      a proximity sensing element associated with the frame and located outside the viewing area of the display device;
      wherein the proximity sensing element is configured to sense a user selecting one of the virtual buttons displayed by the graphic user interface; and
   wherein the input device is configured to communicate the selection of the virtual buttons to the processor.

10. An information handling system according to claim 9, wherein the frame includes a bezel.

11. An information handling system according to claim 9, wherein a user selecting the virtual button displayed by the graphic user interface includes the user touching the display device in the proximity of the virtual button.

12. An information handling system according to claim 9, further comprising the graphic user interface configured to denote a second virtual button outside of the viewing area and on the frame.

13. An information handling system according to claim 9, further comprising:
   a second virtual button on the frame; and
   the proximity sensing element configured to sense a user selecting the second virtual button.

14. An information handling system according to claim 9, wherein the proximity sensing element includes a capacitive proximity sensing element.

15. An information handling system according to claim 9, wherein the frame surrounds the entire viewing area of the display device.

16. An information handling system according to claim 9, wherein the graphic user interface is configured to display a plurality of virtual buttons adjacent the perimeter of the viewing area.

17. A computer program product comprising computer executable instructions, stored on a tangible computer readable medium, for allowing a user to select a virtual button on a display device, the instructions comprising:
   instructions for displaying a plurality of virtual buttons within a contiguous region of a viewing area of the display device, the virtual button adjacent a perimeter defining the viewing area of the display device;
   instructions for sensing a user selecting one of the virtual buttons; and
   instructions for communicating the selection of one of the virtual buttons to a processor.

18. A computer program product according to claim 17, further comprising instructions for displaying a plurality of virtual buttons adjacent the perimeter of the viewing area.

19. A computer program product according to claim 17, further comprising instructions for displaying a second virtual button outside the viewing area of the display device.

20. A computer program product according to claim 17, further comprising instructions for:
   displaying a second virtual button outside the viewing area of the display device; and
   instructions for sensing a user selecting the second virtual button.

* * * * *